Oct. 27, 1925.

J. SLEPIAN

ELECTRICAL APPARATUS

Filed Oct. 15, 1923

WITNESSES:
R. J. Butler.
S M Pimles

INVENTOR
Joseph Slepian.
BY
Wesley G. Carr
ATTORNEY

Oct. 27, 1925.　　　　　　　　　　　　　　　　　　　1,558,938
J. SLEPIAN
ELECTRICAL APPARATUS
Filed Oct. 15, 1923　　　　2 Sheets-Sheet 2
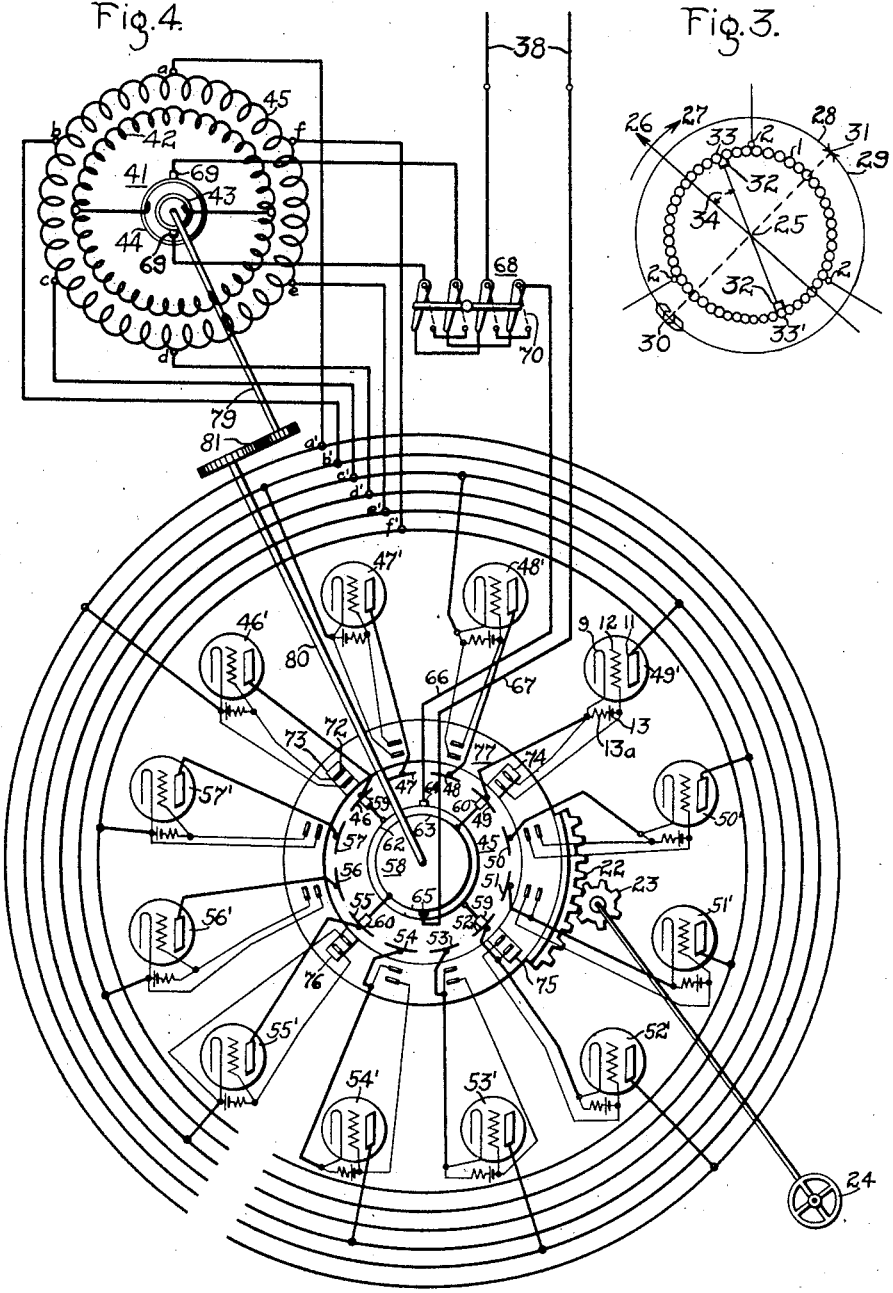
WITNESSES:
R. J. Butler.
S M Pineles
INVENTOR
Joseph Slepian.
BY
Wesley G. Carr
ATTORNEY Patented Oct. 27, 1925.

1,558,938

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL APPARATUS.

Application filed October 15, 1923. Serial No. 668,551.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrical Apparatus, of which the following is a specification.

My invention relates to electrical apparatus and it has particular reference to apparatus having component parts adapted to perform commutating functions with respect to the currents flowing in the apparatus.

One object of my invention is to provide a device including a plurality of space-current valves, that is adapted to perform functions that are ordinarily performed by commutators used upon electric machines.

Another object of my invention is to provide electric machines of the commutator type, wherein the commutating functions are performed by a plurality of space-current valves controlled in accordance with the functions to be performed by such machines.

A further object of my invention is to provide in an electric machine of the commutator type, means responsive to the operation of the machine for controlling the operation of space-current valves adapted to commutate the currents flowing in the machines.

It is well known that the chief limitations in the design of electric machines of the commutator type are the difficulties encountered in the design of commutators adapted to operate on high current density and particularly on high voltage.

I have found that an electrical valve, such as is employed in radio communication and other industrial applications, is well suited to become an important factor in the solution of the commutation problem. The physical limitations of the ordinary commutators are avoided and the possibility of controlling the commutation by an auxiliary machine which has no inherent design difficulties opens new fields for the application of commutating machines.

Whenever I use, in this specification, the word "valve" or "space-current valve", I mean a current-conducting device wherein the current flows between electrodes mainly in the form of conductive gas or vapor particles, or in the form of electrons.

The principles of my invention, together with certain embodiments and applications thereof, will be best understood from the following description taken in connection with the accompanying drawing, wherein Figure 1 is a diagrammatic view of a phase advancer arranged according to my invention;

Fig. 3 is an explanatory diagram referring to Figure 1;

Fig. 4 is a view similar to Fig. 2 of a single-phase commutator motor of the series type embodying my invention.

Figure 1:
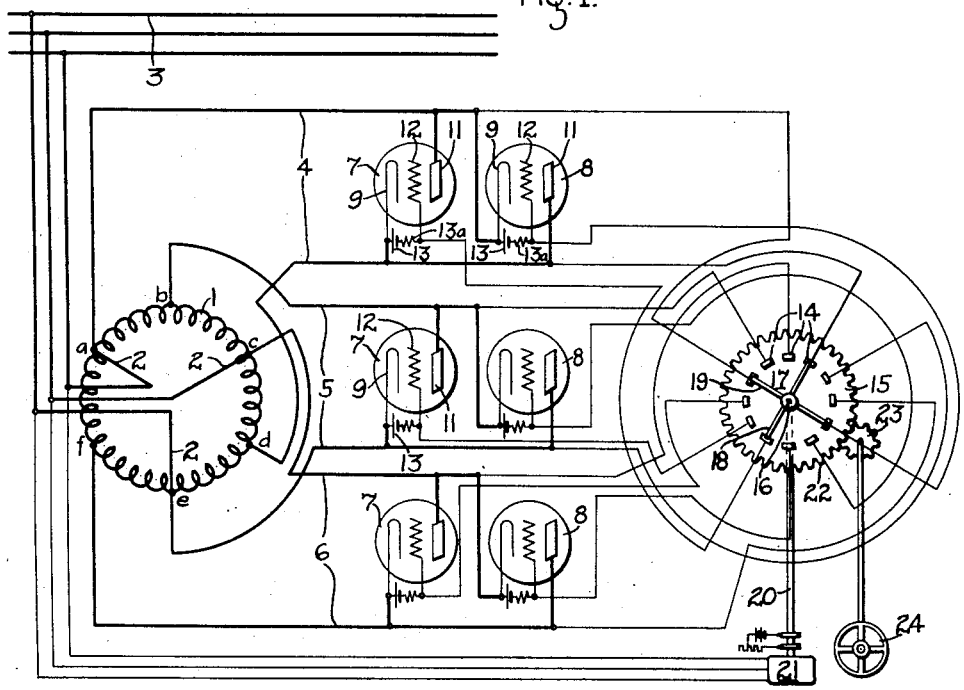

In Fig. 1 is shown a phase advancer comprising a core member provided with a polyphase winding 1 connected, by means of three terminals 2, to a polyphase supply line 3. A plurality of uniformly distributed terminals $a$, $b$, $c$, $d$, $e$ and $f$ are connected, in diametric pairs $a$—$d$, $b$—$e$ and $c$—$f$, to three pairs of conductors 4, 5 and 6, respectively. The corresponding terminals of each of the conductor pairs $a$—$d$, $b$—$e$ and $c$—$f$ are arranged in phase opposition with respect to the magnetic field induced by the polyphase current circulating in the winding, i. e., the voltages of corresponding terminals are at every instant equal and of opposite phase.

Between the two conductors of each of the conductor pairs 4, 5 and 6 are mounted two space-current valves 7 and 8, one valve 7 conducting in the one direction and the other valve 8 conducting in the opposite direction. Each valve is shown as comprising a cathode 9 which may be actuated in any of the manners known in the art, an anode 11 and a control electrode 12. The control electrode 12 is biased with respect to the cathode by means of an auxiliary battery 13 and normally blocks the current flow between the cathode and the anode, rendering the valve normally non-conductive. A current limiting resistor 13$a$ is connected in series with the biasing battery 13.

The terminals of the cathodes 9 and control electrodes 12 are connected to contact memebrs 14 secured annularly upon a circular supporting member 15 which is movable around its center 16. A contact member 17, which is arranged to rotate around the center 16 of the supporting member 15, is provided with two pairs of diametrically extending contact arms 18 and 19 and is driven by means of a shaft 20 coupled to a synchronous motor 21, the latter being supplied from the polyphase line 3. The supporting member 15 is provided with a segmental rack 22 which is operatively engaged by a pinion 23 operated by a hand-wheel 24, for adjusting the position of the contact members 14.

The contact arms 18 and 19 are so arranged that in the position indicated in the drawing, the points $a$ and $d$ of the winding 1 are conductively connected through the valves 7 and 8 by reason of the closed circuit established by the arms 18 and 19 between the control electrodes and the cathodes of the valves 7 and 8, thereby overcoming the blocking action of the biasing batteries 13. In the successive positions occupied by the rotating contact arms 18 and 19, the conductor pairs 4, 5 an 6 are successively close circuited, causing a rotation of the conductive connection between points of the winding 1 which are in phase opposition with respect to tthe magnetic field induced by the currents circulating in the winding.

The operation of the phase advancer illustrated in Fig. 1 will be best understood by reference to Fig. 3. The winding 1 is supplied, through terminals 2, from a polyphase supply line. The current flowing in the winding 1 induces a field which rotates synchronously around the center 25 and corresponds, at each moment, to a definite voltage distribution along the winding 1. The field, which may be represented by a vector 26, rotates in the direction indicated by the arrow 27. The voltage distribution at a certain moment of the operation is indicated by two arrows 28 and 29. The maximum potential difference exists between points 30 and 31 of the winding, on a diameter at right angles to the field vector 26. Points of the winding that are equally distant from the two points 30 and 31, will, in general, have no potential difference and if connected together, no current will flow therebetween.

However, if I provide two brushes 32 connecting two points 33 and 33' disposed along an axis that is angularly displaced from the neutral axis determined by the field vector 26, a unidirectional current will flow between the brushes 32 which will have a magnetizing or demagnetizing effect upon the field of the machine, depending upon the direction of the angle 34 enclosed between the brushes 32 and the field vector 26. As the total flux of the field 26 must remain substantially constant because of the constant voltage of the polyphase supply, the magnetizing or demagnetizing effect of the currents flowing between the brushes 32 will be compensated by a smaller or larger amount of wattless current drawn from the supply line 1, and will be either lagging or leading depending upon the relative position of the brushes 32 with respect to the field vector 26.

A mechanism which provides, in effect, a pair of brushes connecting points of the winding which are of opposite phase relation, said brushes rotating in synchronism with the field 26 will, therefore, act as a true phase advancer. Such a mechanism is illustrated in Fig. 1 wherein the contact member 17 rotates synchronously with the alternating-current supply 3 and short-circuits successively points of the winding in accordance with the rotation of the field. The relative position between the diameter of the closed-circuited points of the winding and the direction of the rotating field may be changed by a rotative movement of the member 15 effected by means of the shifting device 24, and the wattless current drawn from the polyphase supply line 3 may thus be controlled.

In the arrangement shown in Fig. 1, the contact member 17 has two arm-pairs 18 and 19. With this connection, the valves 7 and 8 in the circuit 4 are rendered conductive and the current between the terminals of the winding may flow in either direction, depending upon the direction in which the center line of the short-circuited points has been shifted with respect to the axis of the field. In case only leading currents are drawn, it will be evident that one arm-pair 18 will be sufficient in order to circulate the desired currents. With such an arrangement the valve permits flow of current in one direction only and care has to be taken that a valve of proper polarity shall be operated according to the character of the currents that are circulated.

In the phase-advancer combination shown in Fig. 1, the polyphase supply line 3 may be the secondary circuit of an induction motor, or a transmission line supplying a load of any description, or it may be any other circuit in connection with which a phase-advancer is desirable or commonly employed, either serially or in shunt relation. The core of the polyphase winding 1 may be any closed magnetic circuit such as the core of a transformer, the primary member of an induction motor, or a separate core individual to the phase-advancer. The synchronous driving mechanism 21 is intended, also, to be symbolic of any suitable means for driving the rotating brush-arms 18, 19 in synchronism with the polyphase supply 3 in accordance with the exigencies of any particular application of my invention. In short, I desire Fig. 1 to be regarded as being illustrative of the general principles of my invention, without being limited to any particular application thereof.

Figure 2:
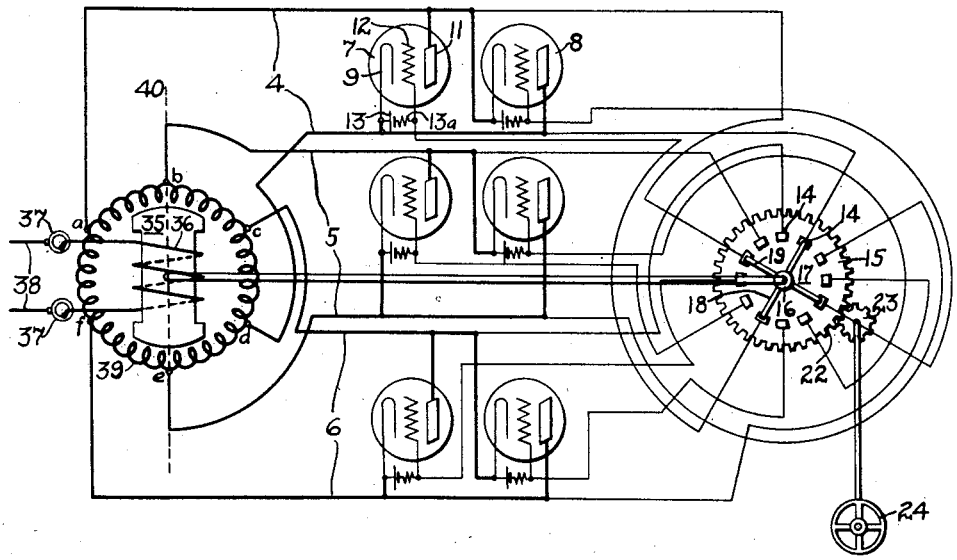
Fig. 2 is a diagrammatic view of a single-phase alternating current motor of the commutator type made according to my invention.

In Fig. 2 is shown an alternating current motor comprising a rotor member 35 having a winding 36 connected, through slip rings 37, to a single-phase supply line 38. The rotor member 35 is schematically shown as a salient-pole structure, in order to make the operation easier to follow, as is frequently done in the theoretical explanation of certain kinds of single-phase motors. It will be understood, however, that any of the usual forms of smooth-core rotors may be employed.

A stator member cooperating with the rotor member 35 comprises a uniformly distributed winding 39 provided with terminals $a$, $b$, $c$, $d$, $e$ and $f$ similar to the winding of the phase advancer shown in Fig. 1. The terminals $a$ to $f$ of the winding 39 are connected to a commutating device similar to that shown in Fig. 1, except that the contact member 17 is coupled mechanically to the rotor 35 and the closed circuits between terminal pairs of the winding 39 are established in synchronism with the rotation of the rotor member 35.

In operation, the apparatus shown in Fig. 3 is so adjusted, as by means of the hand wheel 24, that the diameter along which the closed circuit of the winding 39 is established, leads the rotor axis 40 and a torque is exerted upon the rotor in a manner similar to a repulsion motor. The machine operates, therefore, as an alternating-current motor of the commutator type, without the necessity of overcoming the commutation difficulties encountered in such motors.

In Fig. 4 is shown a series motor of the commutator type arranged according to my invention. A rotor member 41 comprises a winding 42 having two points of opposite polarity connected to slip rings 43 and 44. The stator comprises a winding 45 which is in inductive relation to the rotor winding 42. A plurality of uniformly distributed terminals $a$, $b$, $c$, $d$, $e$ and $f$ are provided on the stator winding 45 and are connected to a plurality of conductors $a'$, $b'$, $c'$, $d'$, $e'$ and $f'$. A stationary commutator member is provided, having 12 annularly disposed commutator segments 46 to 57, the individual segments being connected, by means of corresponding space current valves 46' to 57', to the conductors $a'$, $b'$, $c'$, $d'$, $e'$ and $f'$, respectively. The space current valves 46' to 57' may be of the same type as those shown in Fig. 1, each consisting of a cathode 9, an anode 11 and a control electrode 12 which is biased with respect to the cathode 9 by means of a battery 13, in order to render the valves normally non-conductive.

In the arrangement illustrated in Fig. 4, the commutator segments which are disposed on opposite ends of the same diameter, 46 and 52 for instance, are connected by means of oppositely directed valves 46' and 52' to the same conductor, as $a'$, which leads to the tap $a$ of the stator winding 45. Similarly, the commutator segments 49 and 55, which have an angular displacement of 90° with respect to the aforementioned pair of segments 46 and 52, respectively, are connected by means of a pair of oppositely directed valves 49' and 55', respectively, to the conductor $d'$ leading to the tap $d$ of the stator winding 45, which is in phase opposition with respect to the first mentioned tap $a$.

The commutator segments 46 to 57 are associated with a cooperating rotating member 58, which is provided with two pairs of diametrically opposite brushes 59 and 60. The two brush pairs 59 and 60, which are disposed at right angles to each other, are connected to two slip rings 62 and 63 respectively, and thence, through brushes 64 and 65 respectively, to two supply conductors 66 and 67. One of the supply conductors 67 leads directly to one terminal of the supply line 38. The other conductor 66 leads to a four-blade switch 68 whereby it may be connected either through the brushes 69 and slip rings 43 and 44 in series with the rotor winding 42 to the other terminal of the supply line 38, or, in the second position of the switch, shown in dotted lines 70, directly to the supply line 38 with the rotor winding 42 short-circuited.

The stationary commutator member comprising the commutator segments 46 to 57 comprises a system of contact segments 72, two contact segments corresponding to each of the commutator segments 46 to 57, respectively. The contact segments 72 are electrically connected to the terminals of the blocking batteries 13 of the valves 46' to 57'. By close-circuiting the contact segment 72 of any one of the commutator segments, the corresponding valves are rendered conductive. I effect the latter operation by means of four contact fingers 73 to 76, respectively, that are carried by a supporting member 77 which is secured to the hereinbefore mentioned rotating member 59. The contact fingers 73 to 76 are so arranged that they correspond to the position of the brush pairs 59 and 60 cooperating with the commutator segments 46 to 57. The relative widths, spacings and positions of the brushes 59 and 60, the contact fingers 73 to 76 and the contact segments 46 to 57 are so arranged that the individual valves 46' and 57' are rendered conductive after a brush 59 or 60 comes into contact with a commutator segment and becomes non-conductive before said brush leaves the contact with the segment. Only the latter requirement, however, is of importance for the sparkless operation of the commutator segments and the brushes.

The auxiliary rotor member 58 is driven, by means of shafts 79 and 80 and a gear mechanism 81, by the rotor member 41 of the machine. The gear mechanism 81 is so arranged that the auxiliary rotor member 58 is driven at half the speed of the rotor member 41. The stationary commutator segments 46 to 57 and the contact segments 72 which are associated therewith may be angularly shifted by means of a rack 22, a pinion 23 and an operating wheel 24.

In the operation of the motor illustrated in Fig. 4, the conductive connections from the stator winding 45 to the slip rings 62 and 63 and thence to the supply conductors 66 and 67, are shifted in accordance with the rotation of the rotor 41. For instance, in the position illustrated in Fig. 4, the brush pair 59 leading from the slip ring 62 is in engagement with the commutator segments 46 and 52 respectively, the contact fingers 73 and 75 actuating, at the same time, the two valves 46′ and 52′ which lead from the aforesaid segments to the tap $a$ of the stator winding 45. At the same time, the brush pair 60 leading from the slip ring 63 is connected, through the segments 49 and 55 and the valves 49′ and 55′, to the tap $d$ of the stator winding 39 which is in phase opposition with respect to the tap $a$ to which the slip ring 62 is connected.

In the course of rotation of the rotating member 58 of the commutating device, the brushes 59 and 60 sparklessly leave engagement with the commutator segments leading to taps $a$ and $d$, respectively, and come into contact with the segments 47 and 53 leading to the taps $b$ and $e$, respectively, the slip ring 62 leading to the tap $b$ and the slip ring 63 leading to the tap $e$ of the stator winding 39. The conductive connections are thus successively shifted, the slip rings 62 and 63 being successively connected to all of the taps of the winding 39 during a full rotation of the rotor member 41. It will be noted that only one-half the rotation of the auxiliary rotor member 58 corresponds to a full rotation of the rotor member 41. The symmetrical arrangement of the commutator member 45 and of the auxiliary rotor member 58 secures, however, the same sequence of actions for each half of the rotation of the rotor member 58.

The machine illustrated in Fig. 4 entirely avoids the difficulties encounted in ordinary commutator constructions by reason of the fact that the brushes leave engagement with the respective commutator segments when the brushes are without current and without voltage. From the foregoing description, it will further be obvious that by using twice the number of valves, or by using valves which may conduct in both directions, half of the valves being connected to each of the wires 66 and 67, the commutator segments 46 to 57 and the brushes 59 and 60 may be entirely dispensed with and the current flow in the winding 45 may be directed by means of the valves alone.

With the switch 68 in the position illustrated in the drawing, the supply line 38 is connected in series with the rotor 41 to the stator winding 39. Under these conditions the machine may operate as a series commutator motor either with direct current or with alternating current. With the switch 68 in the position indicated by the dotted lines 70, the rotor member is short-circuited and the supply line 38 is connected directly to the stator winding, the machine being adapted to operate with connections similar to a repulsion motor. The torque and the speed of the machine is controlled by adjusting in the relative positions of the commutator segments by means of the rack 22 and pinion 23.

The devices shown and described in the foregoing specification are intended to be illustrative of machines capable of operation in accordance with my invention. Various modifications in the arrangement and location of parts, and in the application of the principles disclosed in this specification, may be effected within the spirit of my invention, and I desire that all such modifications shall be covered by the appended claims.

I claim as my invention:

1. In an electrical apparatus, the combination of a magnetic core, a winding upon said core, means for energizing said winding from an alternating current system to induce a magnetic field rotating relatively to said winding, a plurality of space-current valves connected to said winding to control the current flow therein in accordance with the rotation of said field so as to effect arbitrarily the excitation of said machine and control the wattless currents taken from said alternating current system, the entire current flowing in said winding being derived from said alternating current system.

2. In an electrical apparatus, the combination of a magnetic core, a winding upon said core, means for energizing said winding from an alternating-current supply system to circulate currents inducing a magnetic field varying relatively to said winding, a plurality of space-current valves interconnecting a plurality of terminals of said winding and means for the control of said valves so as to vary the amount of reactive energy interchanged between said machine and said alternating current system.

3. In an electrical apparatus, the combination of a magnetic core, a winding upon said core, means for energizing said winding from an alternating-current supply line to circulate currents inducing a magnetic field varying relatively to said winding, a plurality of space-current valves connecting points of opposite phase relation upon said winding and so controlled as to permit a flow of current between points of the winding which are in predetermined phase relation to said alternating-current supply.

4. In an electrical apparatus, the combination of a magnetic core, a winding upon said core means for connecting said winding to a polyphase system to circulate currents inducing a magnetic field rotating relatively to said winding, space-current valves connecting a plurality of terminals of said winding, and means for the control of said valves in accordance with the rotation of said field in order to vary arbitrarily the magnetizing action of the currents flowing in said machine and to control the wattless currents flowing between said system and said machine.

5. In an electrical apparatus, the combination of a magnetic core, a winding upon said core, means for connecting said winding to a polyphase system to circulate currents inducing a magnetic field rotating relative to said winding, space-current valves connecting points of said windings that are of electrically opposite phases and means for so controlling said valves as to permit a flow of current between points of the winding which are in definite phase relation with respect to said rotating field.

6. In an electrical apparatus, the combination of a magnetic core, a distributed mesh winding upon said core, means for connecting said winding to a polyphase system and to circulate currents inducing a magnetic field rotating relatively to said winding, space-current valves connecting points of said windings that are of electrically opposite phases, means for controlling said valves to permit a flow of current only between points of the winding which are in definite phase relation with respect to said rotating field and means whereby said phase relation may be changed.

7. In an electric apparatus, the combination of a magnetic core, a winding upon said core, means for energizing said winding from an alternating-current system, a plurality of space-current valves connecting points of the winding that are in phase opposition, each valve comprising a cathode, an anode, and a control electrode, and means connected to said control electrode and actuated in accordance with said alternating current system to render said valves successively conducting during predetermined time periods.

8. In an electric machine, the combination of a magnetic core, a winding upon said core, means for connecting said winding to an alternating-current system, a plurality of space-current valves connecting points of the winding that are in phase opposition, each of said valves comprising a cathode, an anode and a control electrode, means for normally biasing said control electrode with respect to said cathode to prevent current flow between said cathode and said anode, and means including close-circuiting contact members connected to said cathodes and to said control electrodes whereby the preventing action of said control electrodes is successively neutralized and current is circulated between points of the winding which are in predetermined phase relation with respect to the rotation of said machine.

9. In an electrical apparatus, the combination of a magnetic core, a winding upon said core, means for energizing said winding from an alternating-current system, a plurality of space-current valves connecting points of the winding that are in phase opposition, each of said valves comprising a cathode, an anode, and a control electrode, means for so biasing the latter with respect to said cathode as to prevent the flow of current through said valve, and means actuated by said alternating-current system and including close-circuiting contact members connected to said cathodes and said control electrodes whereby the preventing action of said control electrodes is successively neutralized and current is circulated between points of the winding which are in predetermined phase relation with respect to the alternations of said alternating-current system, and means for the control of said predetermined phase relation.

In testimony whereof, I have hereunto subscribed my name this 9th day of October, 1923.

JOSEPH SLEPIAN.